United States Patent [19]

Sims

[11] 4,255,408

[45] Mar. 10, 1981

[54] PROCESS FOR REMOVING SULFUR AND SULFUR COMPOUNDS FROM THE EFFLUENT OF INDUSTRIAL PROCESSES

[75] Inventor: Anker V. Sims, Redondo Beach, Calif.

[73] Assignee: Thermo-Mist Company, Downey, Calif.

[21] Appl. No.: 850,612

[22] Filed: Nov. 11, 1977

Related U.S. Application Data

[63] Continuation-in-part of Ser. No. 706,005, Jul. 16, 1976, abandoned, which is a continuation of Ser. No. 134,511, Apr. 15, 1971, Pat. No. 3,838,979, which is a continuation-in-part of Ser. No. 778,083, Nov. 22, 1968, abandoned.

[51] Int. Cl.$^3$ ............................................. C01B 17/04
[52] U.S. Cl. ................................................ 423/571 R
[58] Field of Search ................ 423/571, 573, 574, 576

[56] References Cited

U.S. PATENT DOCUMENTS

| | | | |
|---|---|---|---|
| 2,767,082 | 10/1956 | Duecker | 423/576 |
| 3,579,302 | 5/1971 | Sefton | 423/574 |
| 3,702,884 | 11/1972 | Hunt et al. | 423/574 |

FOREIGN PATENT DOCUMENTS 717483  10/1954  United Kingdom .

OTHER PUBLICATIONS

Audas, F. G., "Coke and Gas", Jul. 1951, pp. 229-234.
Olsen, J. C., *Unit Processes & Principles of Chem. Eng.* Van Nostrand & Co.; N.Y.; 1932 pp. 1-3.
Lauer, B. E., et al.; *Chemical Engineering Techniques;* Reinhold Pub. Co., N.Y. 1952, pp. 220-222.

*Primary Examiner*—G. O. Peters
*Attorney, Agent, or Firm*—Christie, Parker & Hale

[57] ABSTRACT

Sulfur dioxide in the stack gas from an industrial process is converted to elemental sulfur in a Claus reactor at low temperature to produce sulfur fume. The sulfur is condensed by direct heat transfer with a continuously flowing countercurrent recirculating catalyst and a substantially sulfur dioxide-free gas is discharged. Catalyst and condensed sulfur are fed into the top of a sulfur recovery column and heated in the top of the column by direct heat transfer with a countercurrent stream of recycle gas. The sulfur and catalyst descend into a vaporization zone of the column where sulfur is vaporized. The vaporized sulfur is carried by the recycle gas back towards the top of the column and condensed to a fume by incoming sulfur bearing catalyst. The sulfur fume is carried from the top of the column in cold recycle gas. Hot catalyst from the vaporization section of the column is cooled by recycle gas entering the bottom of the column. Sulfur fume is recovered conventionally. Regenerated catalyst from the column is returned to the sulfur dioxide reactor.

Claus plant tail gas with air passes into the base of an incinerator and passes countercurrent to recycled heat transfer solids and is oxidized to convert sulfur and sulfur bearing compounds to sulfur dioxide. The sulfur dioxide is then converted to sulfur in the process just described.

13 Claims, 2 Drawing Figures

PROCESS FOR REMOVING SULFUR AND SULFUR COMPOUNDS FROM THE EFFLUENT OF INDUSTRIAL PROCESSES

CROSS REFERENCE TO RELATED APPLICATIONS

The present application is a continuation-in-part application of U.S. application Ser. No. 706,005 filed July 16, 1976 now abandoned, and entitled Process for Removing Sulfur and Sulfur Compounds from the Effluent of Industrial Processes, that in turn was a continuation of U.S. application Ser. No. 134,511, filed Apr. 15, 1976, now U.S. Pat. No. 3,838,979 that in turn was a continuation-in-part application of U.S. application Ser. No. 778,083, filed Nov. 22, 1968, the latter application having been abandoned.

BACKGROUND OF THE INVENTION

The present invention relates to the arts of pollution abatement by removal of sulfur and sulfur based compounds from the effluent of industrial processes and efficient conversion of sulfur and sulfur compounds in the effluent to sulfur dioxide prior to such removal.

It is well known that there is considerably interest in using forms of energy other than petroleum. One of the most plentiful sources of energy is coal. Conventional recovery of energy from coal is by combustion with the products of combustion discharged into the environment. Regrettably, a lot of coal has a high sulfur content. An end product of burning coal with sulfur is sulfur dioxide ($SO_2$), relatively small quantities of which in the atmosphere being environmentally unacceptable. Elemental sulfur and other compounds of sulfur are environmentally deleterious and are produced in the tail gases of such processes as the Claus process.

Solutions are being sought for using high-sulfur coal in the production of energy without polluting the environment. One approach to the problem is to burn the coal in a conventional power plant and to remove the resulting sulfur dioxide pollutants from the stack gas discharge from the plant. Various stack gas treatment processes have been suggested, but none are very satisfactory. Some provide adequate treating efficiency but produce large quantitites of non-regeneratable waste. Others cannot treat the gas to sufficiently low sulfur dioxide residual levels to satisfy the requirements of the environment, and still others require the expenditure of too much energy.

Thus a process is needed that will remove the sulfur dioxide to acceptably low levels, that will recover the sulfur in an easy to handle, non-polluting form, and that will do so at an acceptable cost in terms of capital, operating, and energy requirements.

The conversion of the sulfur dioxide by reduction to sulfur by the Claus process is well known. This process reacts hydrogen sulfide and sulfur dioxide in the presence of a catalyst to form sulfur and water in accordance with the following reaction:

$$H_2S + \tfrac{1}{2} SO_2 \xrightarrow{\text{catalyst}} 3/2\, S + H_2O$$

The Claus process is widely used in the petroleum refining industry but is not directly applicable to the removal of sulfur dioxide from stack gas. The limitation of the Claus process as conventionally practiced is that it is not capable of achieving sufficiently low sulfur dioxide concentrations. However, it is recognized that the chemistry of the Claus process can be used to obtain satisfactory sulfur dioxide removals if the temperature of the reaction is reduced. But at low temperature, the sulfur is deposited on the catalyst poisoning the catalyst.

In work done for the National Air Pollution Control Administration (NTIS Report No. PB 200 071) by Princeton Chemical Research Inc. it was shown that a low temperature Claus reaction could be used to satisfactorily treat stack gas from a power plant burning coal containing 3% sulfur. The greatest difficulty with their process is that it calls for the use of fixed beds of catalyst that must be periodically taken from service and heated to remove the sulfur. This regeneration step consumes too much energy. Furthermore, the catalyst is loaded with sulfur for a substantial portion of the on-stream cycle, the loading reducing the catalyst activity and process efficiency.

The products of reaction of the Claus process include more than sulfur and water. Residual amounts of sulfur dioxide and other environmentally sensitive sulfur compounds result. Accordingly, in tail gas treatment from a Claus plant it is desirable to remove all products of concern. Obviously, the economics of conversion are extremely important.

Today, the permissible amount of sulfur in stack gas is determined on the basis of the sulfur expressed as units of sulfur dioxide. Thus 32 grams of elemental sulfur are expressed as 64 grams of sulfur dioxide.

SUMMARY OF THE INVENTION

The process of the present invention is characterized by continuously passing the catalyst of a low temperature Clause process through the Claus reactor and continuously removing condensed sulfur from the catalyst in a highly efficient regenerator.

The regenerator accepts catalyst and sulfur from the reactor and is heated by countercurrent recycle gas in a sulfur condensation zone. The heated catalyst and sulfur pass into a sulfur vaporization zone where the sulfur is vaporized by hot recycle gas. The vaporized sulfur passes with the recycle gas into the sulfur condensation zone where it is condensed and passed from the regenerator for conventional separation from the recycle gas. Catalyst from the vaporization zone passes into a heat recovery zone for heat exchange with countercurrent, incoming recycle gas. The cool catalyst is then recirculated into the Claus reactor.

The same process in a more particular form of the present invention is used in the treatment of Claus plant tail gas to lower the sulfur and sulfur bearing compounds of the tail gas to environmentally acceptable levels. The tail gas is passed into an incinerator and oxidized with air to form sulfur dioxide. The incinerator employs continuously recirculating, heat transfer solids which pass countercurrent to the tail gas to heat the gas prior to the latter's passing into an oxidation zone. In the latter zone, sulfur and sulfur bearing compounds are oxidized to sulfur dioxide, which is passed countercurrent to incoming recycle heating solids to heat the latter and reclaim process heat. The sulfur dioxide is then reduced to sulfur in the manner of the last paragraph. The sulfur vapor in the stack gas is a function of the temperature and pressure of reaction. Since all practical plants operate at atmospheric pressure, the only variable in these plants is temperature. In the process of the present invention, the initial quantity of sulfur in a fuel does not affect the amount of sulfur in the stack gas, within practical limits. It has been determined that a practical upper limit of temperature of catalyst leaving the Claus reactor should be about 320° F. For best heat recovery, the temperature of the recycle gas stream leaving the regenerator should be about the same as the temperature of catalyst going into the regenerator. Thus the temperature of the recycle gas leaving the regenerator should be close to about 320° F. as an upper limit, say 325° F., when the upper temperature limit of the exit stream of catalyst from the Claus reactor is observed.

These and other features, aspects, and advantages of the present invention will become more apparent from the following flow diagrams, description, examples, and appended claims.

DESCRIPTION OF THE PREFERRED EMBODIMENTS

Figure 1:
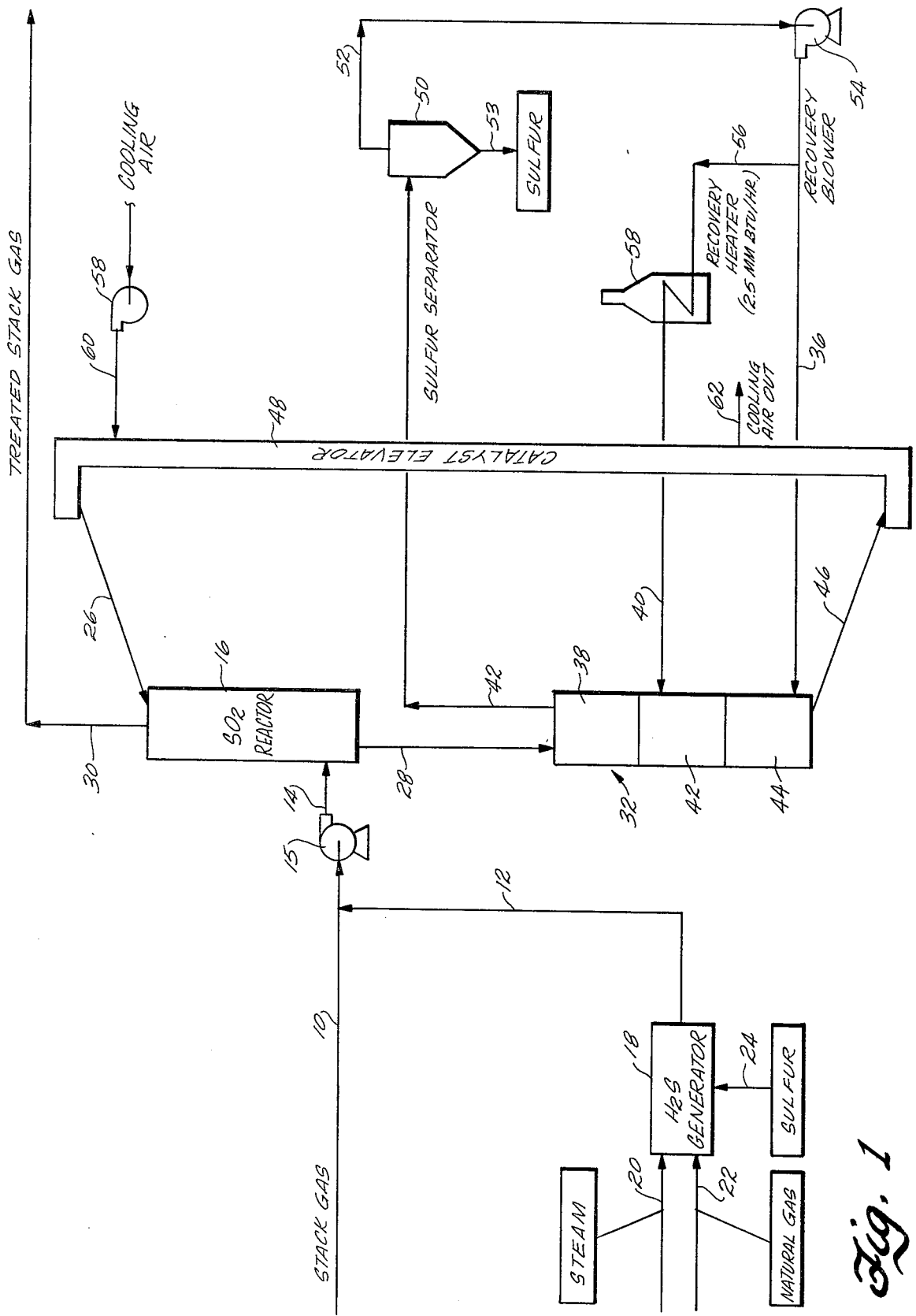
FIG. 1 is a flow diagram of a preferred form of the process of the present invention.

With reference to FIG. 1, stack gas, say from a power plant which generates power by burning high sulfur coal, passes as a stream 10 from the power plant and combines with a stream 12 from a hydrogen sulfide generator to form a makeup stream 14 for a Claus reaction in a reactor 16.

Stream 12 is generated in a hydrogen sulfide generator 18 by a well known reaction of steam, natural gas and sulfur. The steam passes into generator 18 as a stream 20. The natural gas passes into generator 18 as a stream 22. Finally, sulfur passes into generator 18 as a stream 24.

As will become apparent, various streams may have constituents other than those named in this general description, the identity of which will become apparent from the tables that follow.

The stack gas of stream 10 and the hydrogen sulfide of stream 12 combined in stream 14 enter a base of reactor 16 under the driving force of a stack gas blower 15 for passage through the reactor countercurrent to a catalyst. In the reactor, sulfur dioxide reduces to sulfur by the Claus process. A continuous stream 26 entering the top of the reactor provides catalyst for the process. The catalyst passes through reactor 16 by gravity. The temperature of reaction in reactor 16 is sufficiently low that the sulfur produced in the reaction is condensed, preferably to a solid. The temperature could be, for example, about 200° F.

The temperature of reaction in the Claus reactor must be sufficiently low that adequate levels of reduction of sulfur dioxide result. This low temperature results in sulfur depositing on the catalyst. In practical systems, all reactions occur at about atmospheric pressure so the equilibrium constant of the reaction is a function only of temperature. Regardless of the amount of sulfur in the fuel that generates the stack gas, the amount of sulfur leaving the Claus reactor in the treated gas stream is always constant. (The sulfur is, by convention, expressed in units of sulfur dioxide). A practical upper limit of temperature of reaction in the Claus reactor to obtain satisfactory low levels of sulfur in the treated stack gas is about 320° F.

Reaction within the reactor proceeds according to the well known Claus reaction:

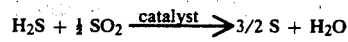

$$H_2S + \tfrac{1}{2} SO_2 \xrightarrow{catalyst} 3/2\, S + H_2O$$

As the contents of stream 14 pass through the reactor, sulfur from the Claus reaction deposits on counterflowing catalyst of stream 26. Catalyst with deposited sulfur exits from reactor 16 as a stream 28. Treated stack gas, that is, the gases remaining after the reaction in reactor 16, leave the reactor as a stream 30 for discharge to atmosphere. Given the maximum temperature of reaction in the Claus reactor to be 320° F., the maximum temperature of exiting catalyst stream 28 is 320° F.

Catalyst and sulfur of stream 28 pass into a sulfur recovery vessel 32 where they pass by gravity in countercurrent flow to a recycle gas stream which enters the vessel as a stream 36 at the base of the vessel. The process that takes place in the sulfur recovery vessel is very similar to the process described in U.S. Pat. No. 3,838,979, an ancestor to this application.

Thus, the top of the vessel is a sulfur condensation zone and is indicated by reference numeral 38. Here, sulfur and catalyst pass downward through the zone and are met by countercurrent recycle gas from stream 36 and a second stream 40. The countercurrent gas entering the sulfur condensation zone is relatively hot and transfers its heat to the incoming catalyst and sulfur. Sulfur generated downstream, in the sense of catalyst and sulfur flow, is condensed in zone 38 and carried from the zone in the recycle gas as a stream 42. Condensation is preferably to a solid fume for maximum heat recovery from the sulfur.

The heated sulfur and catalyst pass from zone 38 into a sulfur vaporization zone 42. There, heat is provided by hot gas from stream 40 and hot recycle gas from stream 36 to heat the sulfur of the descending sulfur and catalyst and vaporize it. The vaporized sulfur passes from zone 42 into zone 38 for its condensation, as just described.

Catalyst passing from sulfur vaporization zone 42 by gravity enters a heat recovery zone 44 where it exchanges heat energy with counterflowing recycle gas, heating the gas and cooling the catalyst. The recycle gas passes through zone 44 on its way to vaporization zone 42 and sulfur condensation zone 38.

Purified catalyst leaves the sulfur recovery vessel as a stream 46 and enters a catalyst elevator 48 of standard design. Catalyst elevator 48 lifts the catalyst for its introduction into Claus reactor 16 and stream 26.

For maximum heat recovery and efficiency, the temperature of catalyst stream 28 and recycle stream 42 should approach each other. For the same reason, the temperature of purified catalyst stream 46 and recycle gas stream 36 should approach each other. If the temperature of stream 42 exceeds the temperature of stream 28, then heat recovery suffers by the difference. In such a case, stream 36 will be at a higher temperature than it was in the ideal case and the catalyst leaving as stream 46 would necessarily be at a higher temperature than in the ideal case. Accordingly, the catalyst would require further cooling by a mechanism not as likely to produce the heat economies of this invention. As a practical matter, some temperature differential must exist between incoming catalyst stream 28 and outgoing recycle gas stream 42, 5° F., for example.

As stated in the referenced patent, the sulfur vapor is condensed to a liquid or solid state by direct heat exchange with the cold incoming ore. The resultant condensate is passed to a conventional collection apparatus such as a bag filter for recovery of the sulfur product. Preferably, sulfur is condensed and removed from the retort as a solid dust or fume. The sulfur can also be condensed as a liquid mist by operating the upper section of the sulfur recovery zone at a higher temperature and using a suitable collection device such as a hot wall cyclone. The heat recovery efficiency using the latter technique is somewhat lower than that obtained when the sulfur is removed as a fume, since the recycle gas usually is at a higher temperature. The lower heat recovery, however, is satisfactory in cases where the sulfur product is required to be in liquid form.

It is generally preferred, however, because of heat recovery economies to condense the sulfur to a sulfur fume. It has been found that fume is originally generated in amorphous form making separation of the fume from its transporting recycle gas difficult. It has been found, however, that if the fume is allowed to age briefly, say 30 seconds, the fume agglomerates into larger particles and the sulfur changes into its stable crystalline form. It is preferred, therefore, to allow the fume to age, typically in its transporting recycle gas, before separating the fume from the recycle gas. When this is done, cyclone separators with their economies can be used because the average particle size is large enough for cyclone separation. Even if not all the fume is separated from the recycle gas, that which is not separated can be recycled with the recycle gas. It is also possible to employ two cyclone separators in series. With this arrangement, the first separator separates out of recycle gas gangue dust before agglomeration of the sulfur. The second cyclone separates the agglomerized and crystalline sulfur from the recycle gas. With these series cyclones a purer sulfur product obviously results.

The sulfur condensate in the reclamation vessel does not re-deposit to any substantial degree on the countercurrent flowing, sulfur ladened catalyst because the condensed sulfur is entrained in the recycle gas stream. In different words, the kinetic energy of the sulfur in the stream is sufficient to keep it in the stream.

The catalyst circuit through the Claus reactor, the recovery vessel, and back by way of the catalyst elevator is continuous. Accordingly, fresh catalyst is always available in the Claus reactor and problems associated with catalyst poisoning by sulfur are minimal. Moreover, the efficiency of the catalyst is greatly enhanced over those types of systems that only periodically remove the catalyst for regeneration. This is so because in the periodic catalyst regeneration scheme the catalyst becomes less and less effective as it is loaded with sulfur, whereas in continuously recycling catalyst, the efficiency is always great because very little sulfur poisoning is experienced.

As previously stated, stream 30 is treated stack gas essentially free of sulfur dioxide. It is also relatively cool having had its heat removed in the upper reaches of Claus reactor 16 by direct heat transfer with descending catalyst from stream 26. Treated stack gas is discharged to atmosphere.

Stream 42 of recycle gas from sulfur recovery vessel 32 passes into a sulfur separator 50 where sulfur is removed from stream 42 as a sulfur stream 53. The sulfur separator may be of standard configuration. Examples of suitable separators are: bag filters and electrostatic precipitators. A stream 52 passes from the sulfur separator under the influence of a recovery blower 54. Stream 52 is divided to form stream 36 and a parallel stream 56. Parallel stream 56 passes into a heater 58 where it is heated and exits as stream 40 for passage into sulfur vaporization zone 42 of sulfur recovery vessel 32. Heater 58 may be of any standard configuration and may burn, for example, natural gas.

Catalyst ascending in catalyst elevator 48 is cooled by cooling air introduced through a blower 58 as a stream 60 into the top of the catalyst elevator. This cooling air exits from the base of the elevator as a stream 62. The cooling air passes in direct countercurrent heat exchange with catalyst in elevator 48.

The following three tables will summarize by way of example the efficiency of the stack gas treatment of the present invention. The first table represents material flow rates for the streams and the temperature of the streams for a catalyst stream 28 at 280° F. and a recycle gas stream 42 at 285° F. The treated stack gas stream temperature is also 280° F. The second table represents material flow rates for the streams and the temperature of the streams for a catalyst stream 28 and treated stack gas stream 30 at 320° F., and a recycle gas stream 42 at 325° F. The third table shows the overall power requirements of the treatment system to generate a given amount of electrical power. The tables are keyed to FIG. 1 for identity of streams and hardware by reference numeral. Thus stream 10 of Table I is stream 10 of FIG. 1. In the tables "$FT^3/hr$" is flow rate in standard cubic feet per hour, "lb/hr" is flow rate in pounds mass per hour, "p.p.m." is parts per million, "°F" is degrees Fahrenheit, "Btu/hr" is British thermal units per hour.

TABLE I

| STREAM | FLOW RATE AND CONSTITUENTS | TEMPERATURE |
|---|---|---|
| STACK GAS STREAMS | | |
| 10 | $N_2$ 5,180,000 lb/hr<br>$O_2$ 264,640 lb/hr<br>$CO_2$ 1,522,400 lb/hr<br>$H_2O$ 262,800 lb/hr<br>$SO_2$ 32,320 lb/hr | 275° F. |
| | TOTAL 7,262,160 lb/hr<br>(92.3 × $10^6$ $FT^3$/hr)<br>($SO_2$ = 2,078 p.p.m.) | |
| 14<br>(10 + 12) | TOTAL 7,311,694 lb/hr<br>(92.8 × $10^6$ $FT^3$/hr) | 280° F. |
| 30 | $N_2$ 5,180,000 lb/hr<br>$O_2$ 264,640 lb/hr<br>$CO_2$ 1,533,312 lb/hr<br>$H_2O$ 281,610 lb/hr<br>$CH_4$ 432 lb/hr<br>S 832 lb/hr<br>$SO_2$ 640 lb/hr | 280° F. |
| | 7,261,466 lb/hr<br>(92.6 × $10^6$ $FT^3$/hr)<br>(S + $SO_2$ = 148 p.p.m.) | |
| HYDROGEN SULFIDE GENERATOR STREAMS | | |
| 20 | $H_2O$ (steam) 9,900 lb/hr | — |
| 22 | $CH_4$ 4,400 lb/hr | — |
| 24 | S 35,200 lb/hr | — |
| 12 | $H_2S$ 33,660 lb/hr<br>$CO_2$ 10,912 lb/hr<br>$H_2O$ 990 lb/hr<br>$CH_4$ 432 lb/hr<br>S 3,520 lb/hr | 1112° F. |

TABLE I-continued

| STREAM | | FLOW RATE AND CONSTITUENTS | TEMPERATURE |
|---|---|---|---|
| | | 49,514 lb/hr | |
| | | (0.5 × 10⁶ FT³/hr) | |
| CATALYST STREAMS | | | |
| 26 | | Catalyst 1,000,000 lb/hr | 150° F. |
| 28 | | Catalyst 1,000,000 lb/hr | 280° F. |
| | S | 50,208 lb/hr | |
| 46 | | Catalyst 1,000,000 lb/hr | 290° F. |
| 48 | | Catalyst 1,000,000 lb/hr | — |
| SULFUR SEPARATION CIRCUIT | | | |
| 42 | $N_2$ | 1,000,000 lb/hr | 285° F. |
| | | (13.6 × 10⁶ FT³/hr) | |
| | S | 50,208 lb/hr | |
| 53 | | 50,208 lb/hr | 285° F. |
| 52 | $N_2$ | 1,000,000 lb/hr | 285° F. |
| 56 | $N_2$ | 10,980 lb/hr | 285° F. |
| | | (0.15 × 10⁶ FT³/hr) | |
| 40 | $N_2$ | (0.15 × 10⁶ FT³/hr) | 1200° F. |
| 36 | $N_2$ | 989,070 lb/hr | 285° |
| CATALYST COOLING | | | |
| 60 | Air | 925,000 lb/hr | 100° F. |
| | | (12.1 × 10⁶ FT³/hr) | |
| 62 | Air | (12.1 × 10⁶ FT³/hr) | 240° F. |

TABLE II

| STREAM | | FLOW RATE AND CONSTITUENTS | TEMPERATURE |
|---|---|---|---|
| STACK GAS STREAMS | | | |
| 10 | $N_2$ | 5,180,000 lb/hr | |
| | $O_2$ | 264,640 lb/hr | |
| | $CO_2$ | 1,522,400 lb/hr | 315° F. |
| | $H_2O$ | 262,800 lb/hr | |
| | $SO_2$ | 32,320 lb/hr | |
| | TOTAL | 7,262,160 lb/hr | |
| | | (92.3 × 10⁶ FT³/hr) | |
| | | ($SO_2$ = 2,078 p.p.m.) | |
| 14 | | | 320° F. |
| (10 + 12) | TOTAL | 7,311,694 lb/hr | |
| | | (92.8 × 10⁶ FT³/hr) | |
| 30 | $N_2$ | 5,180,000 lb/hr | |
| | $O_2$ | 264,640 lb/hr | |
| | $CO_2$ | 1,533,312 lb/hr | 320° F. |
| | $H_2O$ | 281,610 lb/hr | |
| | $CH_4$ | 432 lb/hr | |
| | S | 2,368 lb/hr | |
| | $SO_2$ | 640 lb/hr | |
| | | 7,263,002 lb/hr | |
| | | (92.6 × 10⁶ FT³/hr) | |
| | | (S + $SO_2$ = 344 p.p.m.) | |
| HYDROGEN SULFIDE GENERATOR STREAMS | | | |
| 20 | $H_2O$ (steam) | 9,900 lb/hr | — |
| 22 | $CH_4$ | 4,400 lb/hr | — |
| 24 | S | 35,200 lb/hr | — |
| 12 | $H_2S$ | 33,660 lb/hr | |
| | $CO_2$ | 10,912 lb/hr | |
| | $H_2O$ | 990 lb/hr | 1112° F. |
| | $CH_4$ | 432 lb/hr | |
| | S | 3,520 lb/hr | |
| | | 49,514 lb/hr | |
| | | (0.5 × 10⁶ FT³/hr) | |
| CATALYST STREAMS | | | |
| 26 | | Catalyst 1,000,000 lb/hr | 190° F. |
| 28 | | Catalyst 1,000,000 lb/hr | 320° F. |
| | S | 50,208 lb/hr | |
| 46 | | Catalyst 1,000,000 lb/hr | 330° F. |
| 48 | | Catalyst 1,000,000 lb/hr | — |
| SULFUR SEPARATION CIRCUIT | | | |

TABLE II-continued

| STREAM | | FLOW RATE AND CONSTITUENTS | TEMPERATURE |
|---|---|---|---|
| 42 | $N_2$ | 1,000,000 lb/hr | |
| | | (13.6 × 10⁶ FT³/hr) | 325° F. |
| | S | 48,672 lb/hr | |
| 53 | | 48,672 lb/hr | 325° F. |
| 52 | $N_2$ | 1,000,000 lb/hr | 325° F. |
| 56 | $N_2$ | 10,980 lb/hr | 325° F. |
| | | (0.15 × 10⁶ FT³/hr) | |
| 40 | $N_2$ | (0.15 × 10⁶ FT³/hr) | 1200° F. |
| 36 | $N_2$ | 989,070 lb/hr | 325° F. |
| CATALYST COOLING | | | |
| 60 | Air | 925,000 lb/hr | 100° F. |
| | | (12.1 × 10⁶ FT³/hr) | |
| 62 | Air | (12.1 × 10⁶ FT³/hr) | 240° F. |

TABLE III

| | (Horse Power) | 10⁶ Btu/hr |
|---|---|---|
| Heat to produce 800 megawatts | | 8,000 |
| Bucket Elevator (48) | 175 | 0.45 |
| Cooling Blower (58) | 275 | 0.70 |
| Recovery Blower (54) | 2495 | 6.35 |
| Stack Gas Blower (15) | 7246 | 18.44 |
| Recovery Heater (58) | — | 2.50 |
| Methane for $H_2S$ (104, 500 SCFH) | | 104.50 |
| Steam for $H_2S$ (9,900 lb/hr) | | 9.90 |
| Required for $SO_2$ removal | | 142.84 |
| or 1.8% of fuel to power production | | |

As a review of the tables illustrated, the process for removing sulfur dioxide from stack gas of a power plant is extremely efficient. The energy consumed in the removal of the sulfur dioxide is only about 1.8% of the power produced by the plant. Sulfur recovery vessel 38 is extremely efficient. In this vessel there is direct heat transfer between the catalyst-sulfur input and the recycle gas. All of the sensible heat of the recycle gas and the latent heat of the sulfur vapor is transferred to incoming catalyst and sulfur. Heat is recovered from the catalyst by direct transfer to recycle gas in zone 44. Vaporization zone 42 also enjoys direct heat transfer. Sulfur recovered is easily stored and shipped. Some of the sulfur, of course, is used in makeup stream 24 for hydrogen sulfide generator 18.

The tables show the temperature of catalyst and deposited sulfur stream 28, and recycle gas and entrained condensed sulfur stream 42, approaching each other in temperature with stream 42 being 5° F. hotter than stream 28. Depending on the exigencies of the application, the temperature difference can be as much as about 50° F. or so. At 100° F. temperature differential, the heat loss definitely becomes commercially unacceptable. The same considerations apply for streams 46 and 36. Since there would be very little heat loss in the recycle stream externally of vessel 32, the temperature of stream 36 should approach the temperature of purified catalyst in stream 46 to within about 50° F. Of course the recycle gas stream will be the colder stream.

Figure 2:
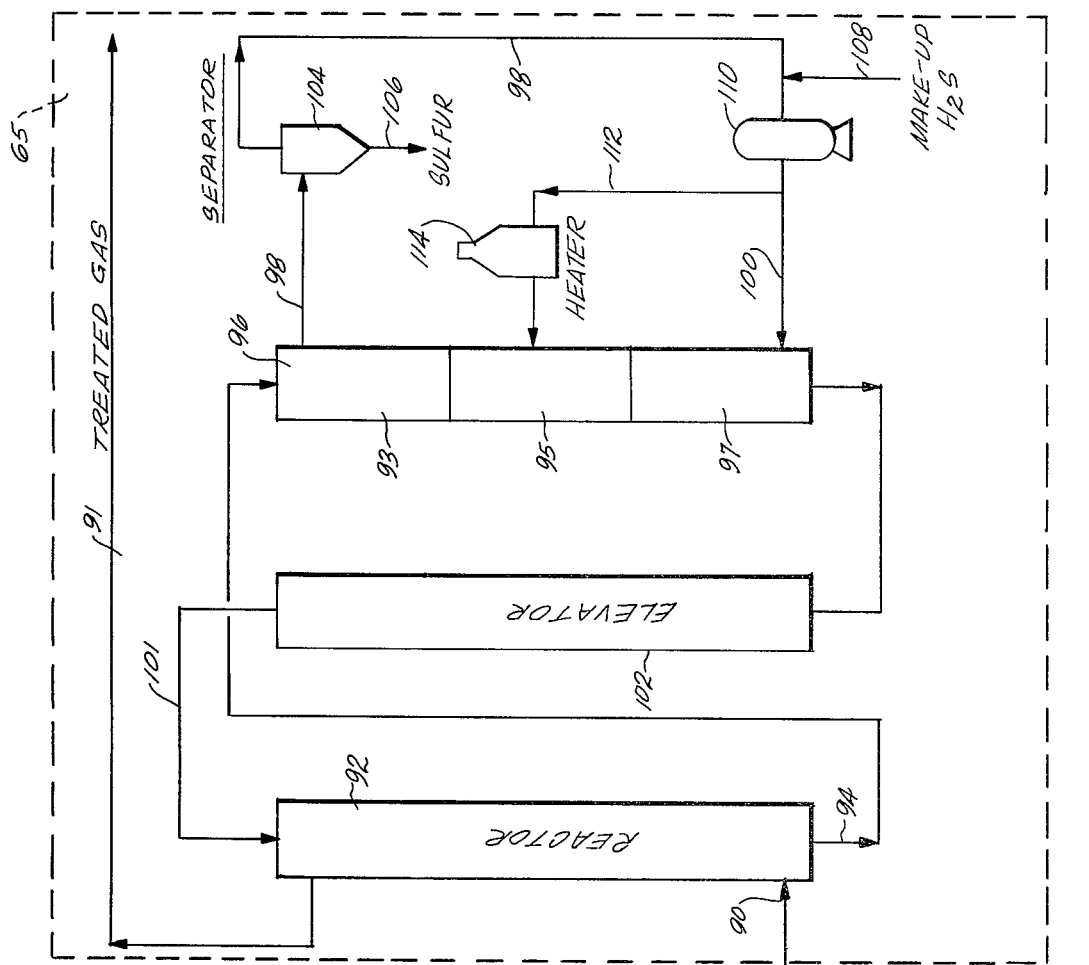
FIG. 2 is a flow diagram of a preferred and more particular form of the process of the present invention.
Figure 2:
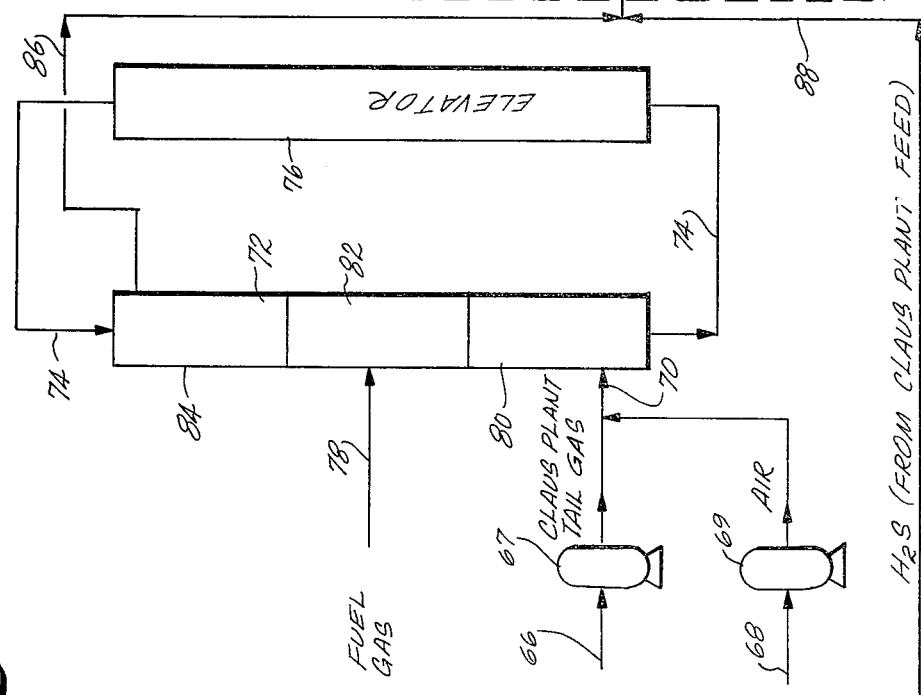

FIG. 2 represents a schematic line diagram for the treatment of Claus plant tail gas. The network within a phantom line envelope 65 is the essential equivalent of the plant of FIG. 1 and will be described only briefly for contextual clarity.

Claus plant tail gas leaves the Claus plant as a stream 66. A tail gas blower 67 in stream 62 boosts the stream. An air stream 68 is moved by air blower 69. The tail gas stream and air stream join to form a combined stream 70. This stream enters the base of a vertical incinerator 72. A stream of heat transfer solids 74 enters the top of the incinerator from an elevator 76. Stream 74 leaves the base of the incinerator for recirculation to the top of the incinerator by the elevator. A fuel gas stream 78 enters the midsection of the incinerator. Stream 62 is constituted primarily for nitrogen and carbon dioxide but has pernicious amounts of hydrogen sulfide, sulfur dioxide, COS, CS$_2$ and sulfur. The sulfur and sulfur bearing compounds are what is treated. Stream 70 entering the base of incinerator 72 ascends through a heat recovery zone 80 in countercurrent flow with heat transfer solids. In zone 80 heated solids transfer their heat to the countercurrent stream. The stream ascends into a combustion zone 82 where the fuel gas and air burn and incompletely oxidized sulfur compounds are oxidized to sulfur dioxide.

The reaction products ascend from the combustion zone into a second heat transfer zone 84 where they pass in direct heat transfer with countercurrent heat transfer solids. The solids pick up heat in this zone and the combustion products and other gases have heat removed.

A stream of gases 86 leaves heat transfer zone 84 at the top of the incinerator and combines with a stream 88 of hydrogen sulfide from the Claus plant feed. The resultant stream is indicated by reference numeral 90 and provides a feed to the base of a reactor 92. Stream 90 is the functional equivalent of stream 14 of the FIG. 1 description and reactor 92 is the functional equivalent of reactor 16. Within reactor 92, a low temperature Claus reaction takes place where the sulfur dioxide of stream 86 reacts with the hydrogen sulfide from stream 88 to produce elemental sulfur which exits as a deposit on catalyst as a stream 94. Treated gas stream 91 exits reactor 92 after giving up heat to countercurrent catalyst.

Stream 94 provides the feed for a catalyst regenerator 96. Catalyst regenerator is the functional equivalent of vessel 32. Catalyst and sulfur of stream 94 descend through the regenerator into a sulfur recovery zone 93 where countercurrent sulfur is condensed to a fume and carried from the zone as a stream 98 of sulfur and inert gas. The heated and descending sulfur and catalyst enter a sulfur vaporization zone 95 where recycled inert gas at a realtively high temperature vaporizes the sulfur. It is this vaporized sulfur which ascends countercurrent to descending catalyst and sulfur, condenses to a fume, and is transported from the regenerator in stream 98. In the sulfur vaporization zone the catalyst, of course, is further heated. The heated catalyst, free of sulfur, descends into a heat recovery zone 97 in the base of the regenerator where it transfers heat with countercurrent recycled gas from a stream 100. The regenerated catalyst as a stream 101 is passed into the top of reactor 92 as through a bucket elevator 102. Stream 98 passes into a sulfur separator 104 where sulfur is removed as a stream 106. Again, the separator may be standard, as a bag separator or an electrostatic precipitator. Stream 98 combines with makeup hydrogen sulfide stream 108 and is fed through a blower 110 towards regenerator 96. A slip-stream from the discharge of blower 110 is split off of stream 98 as a stream 112 and passed into a heater 114. Hydrogen sulfide from a stream 108 is present to reduce any sulfate poisoning of catalyst.

Table IV below shows a material balance for the process of FIG. 2. In the table, LT/D=long tons per day. Again, the streams are keyed to the Figure. The balance is for a 100 long ton per day, two-stage Claus plant.

TABLE IV
MATERIAL BALANCE FOR SULFUR REMOVAL PLANT

| Stream | 62 lb/hr | 66 lb/hr | 88 lb/hr | 86 lb/hr | 98 lb/hr | 95 lb/hr | 74 lb/hr | 94 lb/hr |
|---|---|---|---|---|---|---|---|---|
| H$_2$S | 350 | | 1190 | | 918 | | | |
| SO$_2$ | 275 | | | 1120 | | | | |
| COS | 48 | | | | | | | |
| CS$_2$ | 30 | | | | | | | |
| S | 42 | | | | | | | |
| H$_2$O | 9025 | | | 9210 | | 9840 | | |
| N$_2$, CO$_2$, + O$_2$ | 25466 | 2012 | | 27530 | 14202 | 27530 | | |
| | | 612 | | | | | | |
| Heat Transfer Solids | | | | | | | 37860 | |
| Catalyst | | | | | | | | 15120 |
| Total | 35236 | 2624 | 1190 | 37860 | 15120 | 37370 | 37860 | 15120 |

Sulfur Produced - 1,680 lb/hr, 18 LT/D

The present invention has been described with reference to certain preferred embodiments. The spirit and scope of the appended claims, however, should not necessarily be limited to the foregoing description.

What is claimed is:

1. A process for removing sulfur dioxide from the effluent of an industrial process and for the production of elemental sulfur, the process comprising the steps of:
   (a) continuously passing the effluent and hydrogen sulfide into a Claus reactor;
   (b) continuously passing a catalyst of the Claus reaction into and through the Claus reactor;
   (c) continuously converting a substantial portion of the sulfur dioxide in the effluent to elemental sulfur in the reactor and in the presence of the catalyst by the Claus reaction at a temperature no greater than about 320° F. and at about atmospheric pressure;
   (d) continuously depositing the sulfur thus formed on the catalyst;
   (e) continuously passing the catalyst and the deposited sulfur from the Claus reactor at about the temperature of reaction in the reactor;
   (f) discharging the effluent from the Claus reactor with the substantial portion of the sulfur dioxide removed;
   (g) continuously removing the deposited sulfur from the catalyst that has passed from the Claus reactor externally of the Claus reactor by:
      (i) passing the catalyst and deposited sulfur that has passed from the Claus reactor into a sulfur condensation zone of a sulfur recovery vessel at about the temperature of reaction in the Claus reactor;

(ii) passing the catalyst and the deposited sulfur from the sulfur condensation zone into a sulfur vaporization zone of the sulfur recovery vessel;

(iii) heating the catalyst and sulfur in the sulfur vaporization zone to vaporize the sulfur;

(iv) passing the vaporized sulfur in a stream of recycle gas into the sulfur condensation zone countercurrent to the catalyst and deposited sulfur;

(v) condensing the vaporized sulfur to a liquid or a solid and cooling the recycle gas in the condensation zone by direct heat transfer with the countercurrent catalyst and deposited sulfur and heating the catalyst and deposited during this heat transfer;

(vi) passing the recycle gas with the condensed sulfur entrained therein from the sulfur condensation zone and the recovery vessel, the temperature of the condensed sulfur and recycle gas passed from the sulfur condensation zone approaching the temperature of the catalyst and deposited sulfur entering the sulfur condensation zone by reason of the heat transfer that takes place in the sulfur condensation zone;

(vii) removing the condensed sulfur from the recycle gas; and (viii) recycling the recycle gas into the sulfur recovery vessel;

(h) passing the catalyst from the sulfur vaporization zone into a heat recovery zone of the sulfur recovery vessel;

(i) passing the recycle gas into the sulfur recovery vessel through the heat recovery zone and transferring heat from the catalyst to the recycle gas; and (j) continuously passing the catalyst from the heat recovery zone of the sulfur recovery vessel into the Claus reactor for the conversion of sulfur dioxide to elemental sulfur, the temperature of the catalyst passed from the heat recovery zone approaching the temperature of the recycle gas passing into the heat recovery zone by reason of the heat transfer that takes place in the heat recovery zone, and the temperature of the recycle gas passing into the heat recovery zone being substantially the same as the temperature of the recycle gas passing from the sulfur condensation zone.

2. The process claimed in claim 1 including the step of heating a portion of the recycle gas externally of the sulfur recovery vessel and introducing this heated portion into the sulfur vaporization zone to provide a portion of the heating of the catalyst and sulfur in the sulfur vaporization zone.

3. The process claimed in claim 2 including reducing any sulfate poisoning of the catalyst by hydrogen sulfide in the recycle gas.

4. The process claimed in claim 2 wherein the temperature of the condensed sulfur and recycle gas passed from the sulfur condensation zone approaches to within about 50° F. the temperature of the catalyst and deposited sulfur entering the sulfur condensation zone.

5. The process claimed in claim 4 including the step of heating a portion of the recycle gas externally of the sulfur recovery vessel and introducing this heated portion into the sulfur vaporization zone to provide a portion of the heating of the catalyst and sulfur in the sulfur vaporization zone.

6. A process for removing sulfur dioxide from the effluent of an industrial process and for the production of elemental sulfur, the process comprising the steps of:

(a) continuously passing an effluent stream into a Claus reactor;

(b) generating a stream of hydrogen sulfide;

(c) continuously passing the stream of hydrogen sulfide into the Claus reactor with the effluent;

(d) continuously passing a stream of catalyst through the Claus reactor countercurrent to the hydrogen sulfide and the effluent;

(e) continuously reducing the sulfur dioxide of the effluent to elemental sulfur in the Claus reactor in the presence of the catalyst at a reaction temperature of no more than about 320° F. and at substantially atmospheric pressure;

(f) continuously depositing the sulfur thus produced on the catalyst and in the Claus reactor;

(g) continuously discharging the effluent from the Claus reactor substantially free of sulfur dioxide;

(h) continuously passing the catalyst and deposited sulfur from the Claus reactor in a stream and introducing the stream into a sulfur condensation zone of a sulfur recovery vessel at substantially the reaction temperature in the Claus reactor;

(i) continuously passing the stream of catalyst and deposited sulfur from the sulfur condensation zone into a sulfur vaporization zone of the sulfur recovery vessel;

(j) continuously vaporizing the deposited sulfur in the sulfur vaporization zone by direct heat transfer with a heated recycle gas;

(k) continuously condensing the vaporized sulfur to a liquid or a solid in the sulfur condensation zone by direct heat exchange with the stream of catalyst and deposited sulfur introduced from the Claus reactor to thereby heat the catalyst and deposited sulfur;

(l) continuously passing the condensed sulfur from the sulfur condensation zone entrained in the recycle gas from the sulfur recovery vessel, the temperature of the condensed sulfur and recycle gas passed from the sulfur condensation zone approaching within about 50° F. the temperature of the catalyst and deposited sulfur entering the sulfur condensation zone by reason of the heat transfer that takes place in the sulfur condensation zone;

(m) continuously separating the sulfur from the recycle gas;

(n) continuously recycling the recycle gas into a heat recovery zone of the sulfur recovery vessel after the sulfur separation step and passing such recycle gas countercurrent to the catalyst throughout the sulfur recovery vessel;

(o) passing the catalyst from the sulfur vaporization zone through the heat recovery zone and directly transferring heat from the catalyst to the recycle gas in the heat recovery zone such that the temperature of the catalyst leaving the heat recovery zone approaches the temperature of the recycle gas entering the heat recovery zone within about 50° F., the heat transferred to the recycle gas providing some of the heat used in the sulfur vaporization zone; and (p) continuously reintroducing the catalyst from the heat recovery zone into the Claus reactor as the catalyst that is passed through the Claus reactor.

7. The process claimed in claim 6 wherein the stream of catalyst and deposited sulfur passes through the sulfur condensation zone and enters the sulfur vaporization zone by gravity.

8. The process claimed in claim 6 wherein heat is exchanged in the sulfur condensation zone between the recycle gas and vaporized sulfur on the one hand and the stream of catalyst and deposited sulfur on the other by direct heat transfer, and heat is transferred to the catalyst and deposited sulfur in the sulfur vaporization zone by direct heat transfer with the recycle gas.

9. The process claimed in claim 8 including the steps of separating a slip stream from the recycle gas after sulfur separation, heating the slip stream, and introducing the thus heated slip stream into the sulfur recovery vessel in the sulfur vaporization zone, the heated slip stream and the recycle gas from the heat reclamation zone providing the heated recycle gas that vaporizes the deposited sulfur.

10. The process claimed in claim 9 wherein the catalyst flows through the Claus reactor by gravity.

11. The process claimed in claim 10 wherein the catalyst flows through the sulfur recovery vessel by gravity.

12. A process for the purification of Claus plant tail gas to substantially free such tail gas of sulfur and compounds of sulfur prior to the discharge of the gas to atmosphere, the process comprising the steps of:
(a) continuously passing a stream of Claus plant tail gas into an incinerator;
(b) continuously passing a stream of air into the incinerator with the Claus plant tail gas;
(c) continuously recycling through the incinerator a stream of heat transfer solids countercurrent to the tail gas and air and in direct heat transfer therewith;
(d) continuously transferring heat from the heat transfer solids to the Claus plant tail gas and air in a first heat recovery zone of the incinerator;
(e) after the heat transfer from the heat transfer solids to the tail gas, continuously oxidizing the sulfur and sulfur compounds in the tail gas to sulfur dioxide in an oxidation zone of the incinerator to form a stream including sulfur dioxide;
(f) continuously transferring heat from the stream that includes sulfur dioxide in a second heat recovery zone of the incinerator by direct heat transfer with the countercurrent heat transfer solids to reduce the temperature of the stream that includes sulfur dioxide;
(g) continuously introducing the stream that includes sulfur dioxide and a hydrogen sulfide stream into a Claus reactor and reducing the sulfur dioxide to condensed elemental sulfur therein in the presence of a catalyst and at a temperature no greater than about 320° F. to generate a substantially sulfur-free treated gas stream and catalyst with deposited sulfur thereon, the sulfur depositing on the catalyst.
(h) continuously passing the treated gas stream from the reactor to environment;
(i) continuously passing the catalyst and deposited sulfur from the Claus reactor into a sulfur condensation zone of a catalyst regenerator;
(j) continuously passing the stream of catalyst and deposited sulfur from the sulfur condensation zone into a sulfur vaporization zone of the catalyst regenerator;
(k) continuously vaporizing the deposited sulfur in the sulfur vaporizaton zone by direct heat transfer with a heated recycle gas;
(l) continuously condensing the vaporized sulfur to a liquid or a solid and cooling the recycle gas in the sulfur condensation zone by direct heat exchange with the stream of catalyst and deposited sulfur introduced from the Claus reactor to thereby heat the catalyst and deposited sulfur, the temperature of the recycle gas being no more than about 50° F. higher at the end of the heating of the catalyst and deposited sulfur than the catalyst and deposited sulfur at the beginning of such direct heat exchange;
(m) continuously passing the condensed sulfur from the sulfur condensation zone entrained in the recycle gas from the sulfur recovery vessel;
(n) continuously separating the sulfur from the recycle gas;
(o) continuously recycling the recycle gas into a heat recovery zone of the catalyst regenerator after the sulfur separation step and passing such recycle gas countercurrent to the catalyst throughout the catalyst regenerator; and
(p) passing the catalyst from the sulfur vaporization zone into the heat recovery zone and directly transferring heat from the catalyst to the recycle gas, the catalyst temperature after such direct heat transfer being no more than 50° F. higher than the recycle gas at the beginning of such direct heat transfer.

13. The process claimed in claim 11 wherein the stream which includes sulfur dioxide and the treated gas stream both flow countercurrent to the catalyst in the reactor.

* * * * *

UNITED STATES PATENT AND TRADEMARK OFFICE
CERTIFICATE OF CORRECTION

PATENT NO. : 4,255,408
DATED : March 10, 1981
INVENTOR(S) : Anker V. Sims

It is certified that error appears in the above—identified patent and that said Letters Patent is hereby corrected as shown below:

In the specification: Column 1, line 14, "1976" should be --1971--; Column 1, line 25, "considerably" should be --considerable--; Column 2, line 36, "Clause" should be --Claus--; Column 7, lines 46 and 47, between "$SO_2$ - 640 lb/hr and 7,263,002 lb/hr" there should be a horizontal line; Column 7, lines 58 and 59, between "S - 3,520 lb/hr and 49,514 lb/hr" there should be a horizontal line.

Signed and Sealed this

Thirtieth Day of June 1981

[SEAL]

Attest:

RENE D. TEGTMEYER

Attesting Officer

Acting Commissioner of Patents and Trademarks